United States Patent
Miyazaki et al.

(10) Patent No.: US 9,169,786 B2
(45) Date of Patent: Oct. 27, 2015

(54) VEHICLE ENGINE CONTROL DEVICE

(75) Inventors: Terufumi Miyazaki, Toyota (JP); Yukihiko Ideshio, Nisshin (JP); Toshihiko Kamiya, Toyota (JP); Shingo Eto, Gamagori (JP); Hironori Asaoka, Nisshin (JP); Yasuyuki Kato, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 62 days.

(21) Appl. No.: 14/342,279

(22) PCT Filed: Sep. 2, 2011

(86) PCT No.: PCT/JP2011/070070
§ 371 (c)(1),
(2), (4) Date: Feb. 28, 2014

(87) PCT Pub. No.: WO2013/031023
PCT Pub. Date: Mar. 7, 2013

(65) Prior Publication Data
US 2014/0216375 A1 Aug. 7, 2014

(51) Int. Cl.
*F01L 1/34* (2006.01)
*F02D 13/02* (2006.01)
*B60K 6/48* (2007.10)
*B60W 10/06* (2006.01)
*B60W 10/08* (2006.01)
*B60W 20/00* (2006.01)
(Continued)

(52) U.S. Cl.
CPC ............. *F02D 13/02* (2013.01); *B60K 6/445* (2013.01); *B60K 6/48* (2013.01); *B60W 10/06* (2013.01); *B60W 10/08* (2013.01); *B60W 20/00* (2013.01); *F02D 13/0219* (2013.01); *F02D 29/02* (2013.01); *F02D 41/06* (2013.01); *F02N 19/004* (2013.01); *F01L 1/3442* (2013.01); *F01L 2001/34459* (2013.01); *F01L 2001/34466* (2013.01); *F02D 2013/0292* (2013.01); *F02N 11/04* (2013.01); *Y02T 10/18* (2013.01); *Y02T 10/6221* (2013.01); *Y02T 10/6239* (2013.01); *Y02T 10/6286* (2013.01); *Y02T 10/84* (2013.01)

(58) Field of Classification Search
CPC ................ F01L 1/3442; F01L 2001/34459; F02D 13/02; F02D 2013/0292; Y02T 10/6286
USPC .......................................... 123/90.15, 90.17
See application file for complete search history.

(56) References Cited

U.S. PATENT DOCUMENTS 8,215,272 B2 * 7/2012 Takemura et al. ......... 123/90.15
2010/0288215 A1 11/2010 Takemura et al.

FOREIGN PATENT DOCUMENTS

JP 2002-256910 A 9/2002
JP 2004-308632 A 11/2004
(Continued)

*Primary Examiner* — Ching Chang
(74) *Attorney, Agent, or Firm* — Kenyon & Kenyon LLP

(57) ABSTRACT

A control device of a vehicle engine comprises: an electric motor rotationally driving an engine to start the engine; a variable valve timing mechanism varying a valve timing of an intake valve of the engine; and an intermediate lock mechanism mechanically locking the valve timing at an intermediate position between a most delayed position and a most advanced position of the valve timing, if an output limitation of the electric motor is predicted at restart of the engine, the valve timing at the time of stop of the engine being locked at the intermediate lock position by the intermediate lock mechanism.

4 Claims, 6 Drawing Sheets

(51) Int. Cl.
*B60K 6/445* (2007.10)
*F02D 41/06* (2006.01)
*F02D 29/02* (2006.01)
*F02N 19/00* (2010.01)
*F02N 11/04* (2006.01)
*F01L 1/344* (2006.01)

(56) References Cited

FOREIGN PATENT DOCUMENTS

| | | |
|---|---|---|
| JP | 2006-283704 A | 10/2006 |
| JP | 2007-064127 A | 3/2007 |
| JP | 2010-265760 A | 11/2010 |

* cited by examiner

VEHICLE ENGINE CONTROL DEVICE

CROSS REFERENCE TO RELATED APPLICATION

This is a national phase application based on the PCT International Patent Application No. PCT/JP2011/070070 filed on Sep. 2, 2011, the entire contents of which are incorporated herein by reference.

TECHNICAL FIELD

The present invention relates to a control device of a vehicle engine including a variable valve timing mechanism having an intermediate lock function.

BACKGROUND ART

It is generally known that efficiency and fuel consumption of an engine can be improved at a low load by utilizing the Atkinson cycle, in which an intake air amount is limited by delaying an intake timing to make an expansion ratio larger than a compression ratio, for example. However, such an engine utilizing the Atkinson cycle has a problem of difficulty in engine start due to insufficient explosion power at the start. In this regard, for example, as described in Patent Document 1, Patent Document 2, and Patent Document 3, control devices of vehicle engines including a variable valve timing mechanism having an intermediate lock function have been proposed. These vehicle engines have a delayed position of a cam mechanically locked at an intermediate lock position before stop of the engines by an intermediate lock mechanism during stopping of the engines so as to prevent the engines from becoming difficult to start because the cam is returned to the most delayed position due to escape of hydraulic pressure at the time of engine stop. As a result, startability of the engines and the efficiency and fuel consumption of the engines are improved.

PRIOR ART DOCUMENTS

Patent Documents

Patent Document 1: Japanese Laid-Open Patent Publication No. 2007-064127
Patent Document 2: Japanese Laid-Open Patent Publication No. 2006-283704
Patent Document 3: Japanese Laid-Open Patent Publication No. 2002-256910

SUMMARY OF THE INVENTION

Problem to Be Solved by the Invention

However, each time an engine is stopped, the conventional intermediate lock mechanism performs an intermediate lock in the stopping process of the engine and the phase of the cam is mechanically locked at a lock position before the most delayed position so as to fix the phase of the cam before the most delayed position. However, a vehicle capable of starting an engine by using an electric motor, for example, a hybrid vehicle, has a need for starting the engine in a decompression state with the cam delayed to the most delayed position in the engine at normal temperature so as to reduce an engine start shock. The vehicle also has a need for mechanically locking the cam at the lock position before the most delayed position by the intermediate lock mechanism since the engine may not be started due to insufficiency of explosion power in the decompression state at the start of the engine at extremely-low temperature.

In this regard, as described in Patent Documents 1 and 2, when the engine is stopped, if an engine state amount such as oil temperature satisfies an engine startability condition at the most delayed position, the phase of the cam is controlled to the delayed side relative to the intermediate lock position before the stop of the engine such that the engine is restarted in the most delayed phase so as to reduce vibrations at the time of restart, while if the engine state amount does not satisfy the engine startability condition at the most delayed position because of a lower oil temperature etc., the phase of the cam is fixed to the intermediate lock position before the stop of the engine so as to increase re-startability of the engine in the described control.

However, such conventional control includes determining whether the engine can be restarted at an intake valve timing of the most delayed position, based on a state of the engine such as oil temperature. For example, when the engine is cranked by an electric motor having an output torque capacity capable of driving the engine as in the case of a hybrid vehicle, if an original output from the electric motor is limited by an electric storage state of a battery and a heat generation state of an inverter, the engine may become difficult to restart at the most delayed position.

The present invention was conceived in view of the situations and it is therefore an object of the present invention to provide a control device of a vehicle engine capable of achieving the startability of the engine even when an electric motor starting the engine has a limitation in output in the vehicle engine including a variable valve timing mechanism having an intermediate lock function.

Means for Solving the Problem

To achieve the object, the present invention provides a control device of a vehicle engine comprising: (a) an electric motor rotationally driving an engine to start the engine; a valve timing mechanism varying a valve timing of an intake valve of the engine; and an intermediate lock mechanism mechanically locking the valve timing at an intermediate position between a most delayed position and a most advanced position of the valve timing, wherein (b) if an output limitation of the electric motor is predicted at restart of the engine, the valve timing at the time of stop of the engine is locked at the intermediate lock position by the intermediate lock mechanism.

Effects of the Invention

According to the control device of a vehicle engine of the present invention configured as described above, if an output limitation of the electric motor is predicted at the restart of the engine, the valve timing of the intake valve is fixed to the intermediate position within the delay range in the process of locking the valve timing at the time of stop of the engine to the intermediate lock position by the intermediate lock mechanism and, therefore, the explosion power and the re-startability at the restart of the engine is increased.

Preferably, if the output limitation of the electric motor is not predicted at the restart of the engine, the valve timing at the time of stop of the engine is not locked at the intermediate lock position by the intermediate lock mechanism. Consequently, since the output limitation of the electric motor is not performed at the restart of the engine, the engine can be started from a most delayed state and the vibrations at the restart can be reduced.

Preferably, if a torque limitation of the electric motor is predicted in addition to prediction of the output limitation of the electric motor at the restart of the engine, the valve timing at the time of stop of the engine is not locked at the intermediate lock position by the intermediate lock mechanism. Consequently, if the torque limitation is predicted in addition to the output limitation of the electric motor at the restart of the engine, since the valve timing is not locked at the intermediate lock position by the intermediate lock mechanism at the time of stop of the engine, the engine can be driven at the most delayed position associated with a relatively lower rotation load of the engine by utilizing the fact that an output torque lower than the output torque value capable of securing the re-startability of the engine can be output within a range of the limited output of the electric motor, thereby preferentially cranking the engine to secure the re-startability thereof.

Preferably, the output limitation of the electric motor at the restart of the engine is predicted based on at least one of a temperature of the electric motor, a temperature of an inverter controlling a drive current of the electric motor, rise of a temperature of a battery supplying a drive current to the electric motor, fall of a temperature of the battery, and a charge remaining amount SOC of the battery. Consequently, the output limitation of the electric motor is certainly predicted depending on a vehicle state.

MODE FOR CARRYING OUT THE INVENTION

Figure 1:
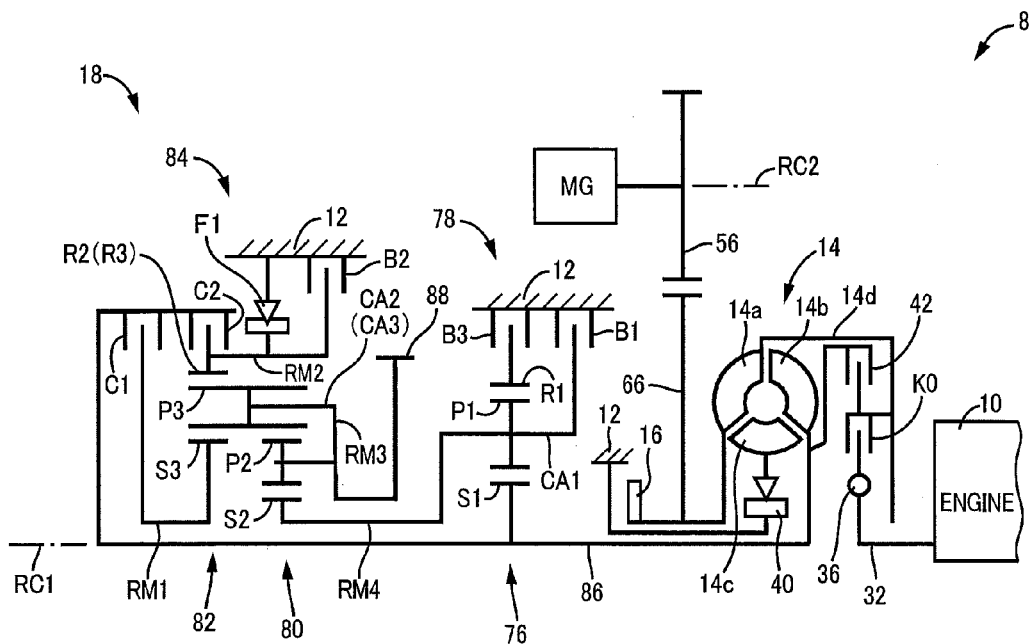
FIG. 1 is a schematic for explaining a configuration of a vehicle drive device to which a control device of a vehicle engine of the present invention is preferably applied.
Figure 2:
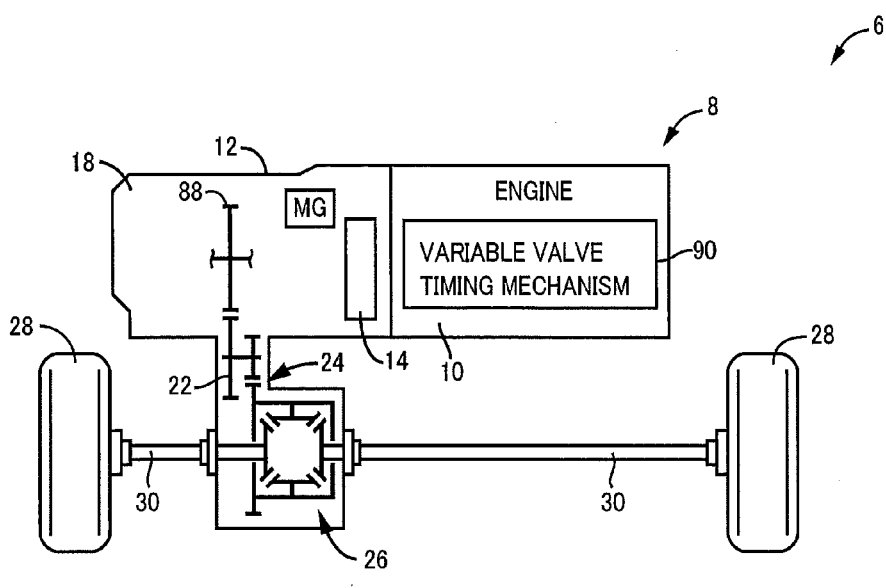
FIG. 2 is a diagram depicting a power transmission path from an engine to drive wheels in a vehicle including the vehicle drive device of FIG. 1.

An embodiment of the present invention will now be described in detail with reference to the drawings.
Embodiment
FIG. 1 is a schematic for explaining a configuration of a main portion of a vehicle drive device 8 to which a control device of a vehicle engine including a variable valve timing mechanism of the present invention is preferably applied. FIG. 2 is a diagram for explaining a power transmission path from the vehicle drive device 8 to drive wheels 28.

As depicted in FIGS. 1 and 2, the vehicle drive device 8 has a case 12 as a non-rotating member attached to a vehicle body by bolts etc., includes an engine intermittent clutch K0, a torque converter 14, a hydraulic pump 16, and an automatic transmission 18 in the case 12 on a first axial center RC1 in order, i.e., in series, from an engine 10 side, and includes an electric motor MG rotationally driven around a second axial center RC2 parallel to the first axial center RC1. As depicted in FIG. 2, the drive device 8 includes a counter driven gear 22 meshed with an output gear 88 that is an output rotating member of the automatic transmission 18, a final gear pair 24, and a differential gear device (differential gear) 26 coupled via the final gear pair 24 to the counter driven gear 22 in the case 12. The drive device 8 configured as described above is transversely mounted on a front side of a front-wheel drive, i.e., FF type vehicle 6 and is preferably used for driving the drive wheels 28. In the drive device 8, if the engine intermittent clutch K0 is engaged, power of the engine 10 is transmitted from an engine coupling shaft 32 coupling the engine 10 and the engine intermittent clutch K0 sequentially through the engine intermittent clutch K0, the torque converter 14, the automatic transmission 18, the counter driven gear 22, the final gear pair 24, the differential gear device 26, a pair of driving axles 30, etc., to a pair of the drive wheels 28.

The engine 10 is included in the drive device 8 and is an internal combustion engine having a crankshaft rotationally driven around the first axial center RC1. The internal combustion engine is a gasoline engine, a diesel engine, etc., having variable opening/closing timing of an intake valve and/or an exhaust valve, i.e., a valve timing.

The engine coupling shaft 32 included in the drive device 8 is disposed rotatably around the first axial center RC1 and unmovably in the first axial center RC1 direction relative to the case 12. The engine coupling shaft 32 is relatively non-rotatably coupled at one end to the crankshaft (engine output shaft) of the engine 10 and includes a clutch coupling portion projecting radially outward at the other end. The clutch coupling portion includes a buffer device 36 having a spring etc., as constituent parts and acting as a damper and the buffer device 36 transmits an engine torque Te to the engine intermittent clutch K0 while suppressing pulsation of the engine torque Te.

The engine intermittent clutch K0 is a wet multi-plate type hydraulic friction engagement device in which a plurality of friction plates overlapped with each other is pressed by a hydraulic actuator, and is subjected to engagement/release control by a hydraulic control circuit included in the drive device 8 by using an oil pressure generated by the hydraulic pump 16 as an original pressure. The engine intermittent clutch K0 rotates a pump impeller 14a integrally with the engine 10 via the engine coupling shaft 32 in an engaged state. Therefore, in the engaged state of the engine intermittent clutch K0, a drive force from the engine 10 is input to the pump impeller 14a. On the other hand, in a released state of the engine intermittent clutch K0, a power transmission between the pump impeller 14a and the engine 10 is interrupted.

The torque converter 14 includes the pump impeller 14a, a turbine impeller 14b, a stator impeller 14c, and a torque converter case 14d. The torque converter 14 transmits a drive force input to the pump impeller 14a via fluid to the automatic transmission 18. The pump impeller 14a of the torque converter 14 is fixed to an inside of the torque converter case 14d and is coupled via the torque converter case 14d to the engine intermittent clutch K0. Therefore, the pump impeller 14a and the torque converter case 14d are coupled successively through the engine intermittent clutch K0 and the engine coupling shaft 32 to the engine 10 and are rotatable around the first axial center RC1, and the pump impeller 14a and the torque converter case 14d are input-side rotating members (input-side rotating elements) of the torque converter 14 receiving an input of the drive force from the engine 10. The turbine impeller 14b is an output-side rotating member (output-side rotating element) of the torque converter 14 and is relatively non-rotatably coupled to a transmission input shaft 86 that is an input shaft of the automatic transmission 18 by spline fitting, etc. The stator impeller 14c is coupled via a unidirectional clutch 40 to a non-rotating member.

The torque converter 14 houses and includes a lockup clutch 42 in the torque converter case 14d. The lockup clutch 42 is a direct clutch disposed between the pump impeller 14a and the turbine impeller 14b and is put into an engaged state, a slip state, or a released state by hydraulic control etc. When the lockup clutch 42 is put into the engaged state, strictly, into a completely engaged state, the pump impeller 14a and the turbine impeller 14b are integrally rotated around the first axial center RC1.

The electric motor MG has the second axial center RC2 parallel to the first axial center RC1 as a rotation axial center and is a so-called motor generator having a motor function of outputting a drive force along with an electric generation function of charging an electric storage device. An electric motor output gear 56 is disposed in series with the electric motor MG.

On the first axial center RC1, the drive device 8 includes an electric motor coupling rotating element 66 coupling the electric motor output gear 56 and the torque converter case 14d in a power transmittable manner. Therefore, the electric motor coupling rotating element 66 is coupled relatively non-rotatably around the first axial center RC1 to the torque converter case 14d and the pump impeller 14a fixed thereto. The electric motor MG is operatively coupled via the electric motor output gear 56 and the electric motor coupling rotating element 66 to the pump impeller 14a as described above and a drive force from the electric motor MG is transmitted successively through the electric motor output gear 56, the electric motor coupling rotating element 66, and the torque converter case 14d to the pump impeller 14a. Rotation of the electric motor MG is reduced and transmitted to the pump impeller 14a.

The automatic transmission 18 is a transmission making up a portion of a power transmission path between the torque converter 14 and the drive wheels 28 (see FIG. 2) and the drive forces from the engine 10 and the electric motor MG are input thereto. The automatic transmission 18 is a transmission including a plurality of hydraulic friction engagement devices (clutches C, brakes B), specifically, five hydraulic friction engagement devices, and selectively establishing a plurality of shift stages (gear stages) by switching any of the hydraulic friction engagement devices to be gripped. As depicted in FIG. 1, the automatic transmission 18 has a first transmission portion 78 made up mainly of a first planetary gear device 76 of single pinion type and a second transmission portion 84 made up mainly of a second planetary gear device 80 of double pinion type and a third planetary gear device 82 of the single pinion type as Ravigneaux type on the same axis line (on the first axial center RC1) and changes a speed of a rotation of the transmission input shaft 86 to output the rotation from the output gear 88.

The first planetary gear device 76 making up the first transmission portion 78 includes a first sun gear S1, a first pinion gear P1, a first carrier CA1 supporting the first pinion gear P1 in a rotatable and revolvable manner, and a first ring gear R1 meshed via the first pinion gear P1 with the first sun gear S1, and the first sun gear S1, the first carrier CA1, and the first ring gear R1 respectively make up three rotating elements. In the first planetary gear device 76, when the first sun gear S1 is coupled to the transmission input shaft 86 and rotationally driven and the first ring gear R1 is non-rotatably fixed via a third brake B3 to the case 12, the first carrier CA1 acting as an intermediate output member is rotated at a reduced speed relative to the transmission input shaft 86.

The second planetary gear device 80 making up the second transmission portion 84 includes a second sun gear S2, a second pinion gear P2 and a third pinion gear P3 meshed with each other to make up a pair, a second carrier CA2 supporting the pinion gears P2 and P3 in a rotatable and revolvable manner, and a second ring gear R2 meshed via the pinion gears P2 and P3 with the second sun gear S2. The third planetary gear device 82 making up the second transmission portion 84 includes a third sun gear S3, a third pinion gear P3, a third carrier CA3 supporting the third pinion gear P3 in a rotatable and revolvable manner, and a third ring gear R3 meshed via the third pinion gear P3 with the third sun gear S3. In the second planetary gear device 80 and the third planetary gear device 82, portions are coupled to each other to make up four rotating elements RM1 to RM4.

The first rotating element RM1 (the third sun gear S3) is selectively coupled via a first clutch C1 to the transmission input shaft 86. The second rotating element RM2 (the ring gears R2, R3) is selectively coupled via a second clutch C2 to the transmission input shaft 86 and is selectively coupled by a second brake B2 to the case 12 to stop rotation. The fourth rotating element RM4 (the sun gear S2) is integrally coupled to the first carrier CA1 of the first planetary gear device 76 and is selectively coupled by a first brake B1 to the case 12 to stop rotation. The third rotating element RM3 (the carriers CA2, CA3) is integrally coupled to the output gear 88 to output rotation. A unidirectional clutch F1 is an engagement element allowing positive rotation of the second rotating element RM2 (the same rotation direction as the transmission input shaft 86) and preventing inverse rotation and is disposed between the second rotating element RM2 and the case 12 in parallel with the second brake B2.

The clutches C1, C2 and the brakes B1, B2, B3 (hereinafter simply referred to as "clutches C", "brakes B" if not particularly distinguished) are hydraulic friction engagement devices (hydraulic friction engagement elements) subjected to engagement control by hydraulic actuators, such as wet multi-plate type clutches and brakes, and are subjected to engagement/release control by the hydraulic control circuit included in the drive device 8 by using an oil pressure generated by the hydraulic pump 16 as an original pressure. The engagement/release control of each of the clutches C and the brakes B establishes each gear stage (each shift stage) of six forward speeds and one reverse speed depending on accelerator operation of a driver, a vehicle speed V, etc.

Figure 3:
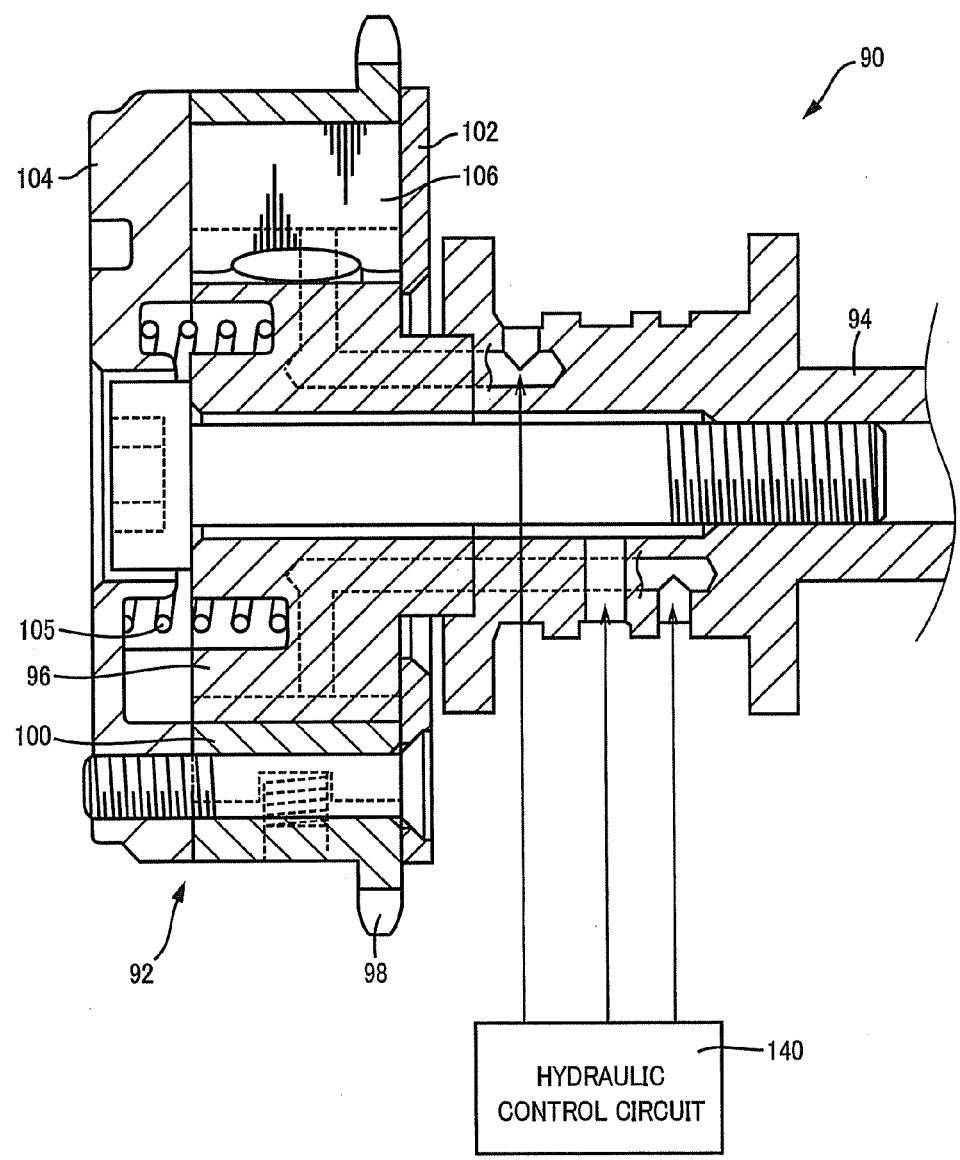
FIG. 3 is a cross sectional view indicated by a section including a rotation shaft center of a cam for explaining a main portion of a variable valve timing mechanism included in the engine of FIGS. 1 and 2.
Figure 4:
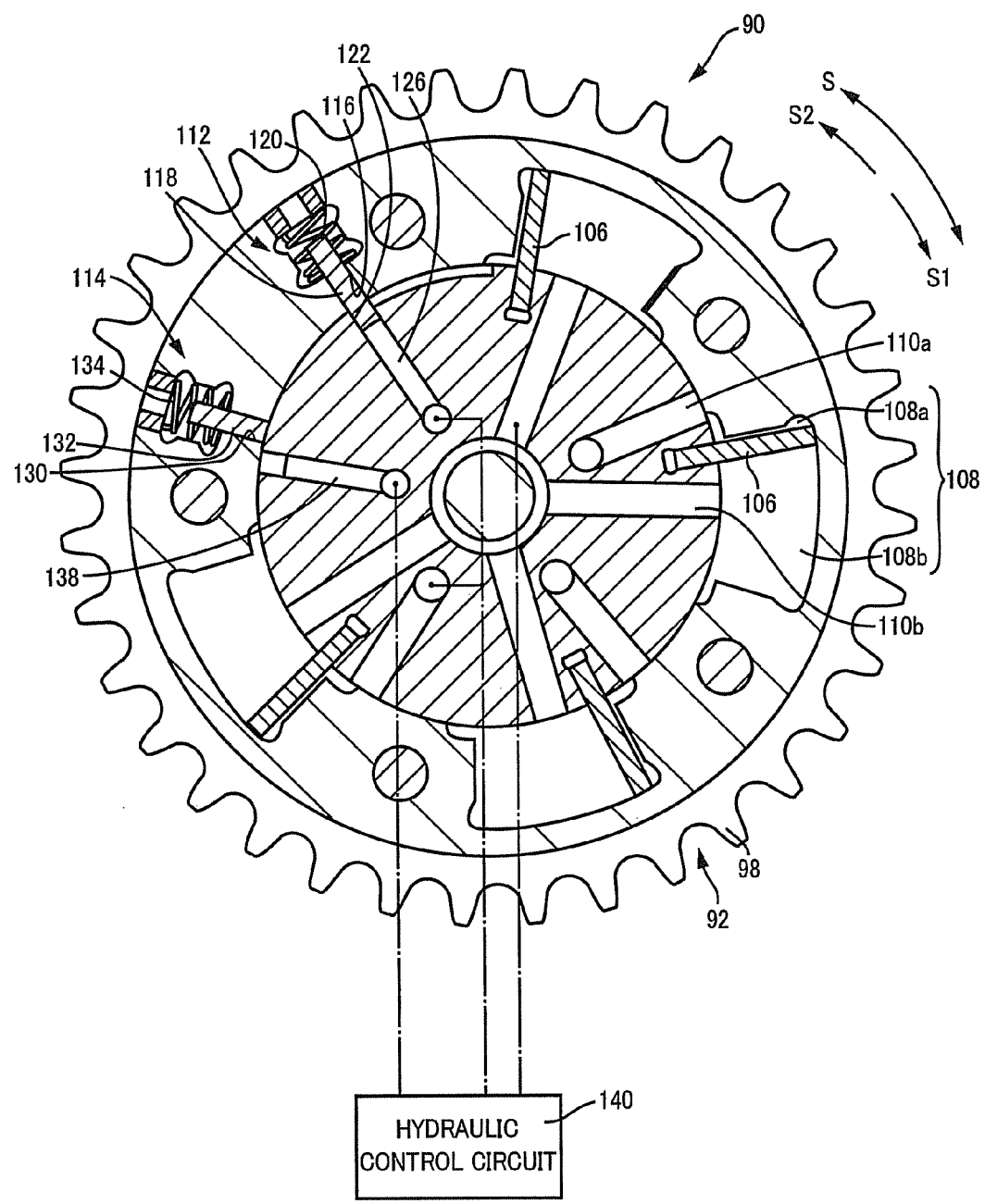
FIG. 4 is a cross sectional view indicated by a section orthogonal to the rotation shaft center of the cam for explaining the variable valve timing mechanism of FIG. 3 and depicts a state fixing opening/closing timing of the cam at the most delayed position.
Figure 5:
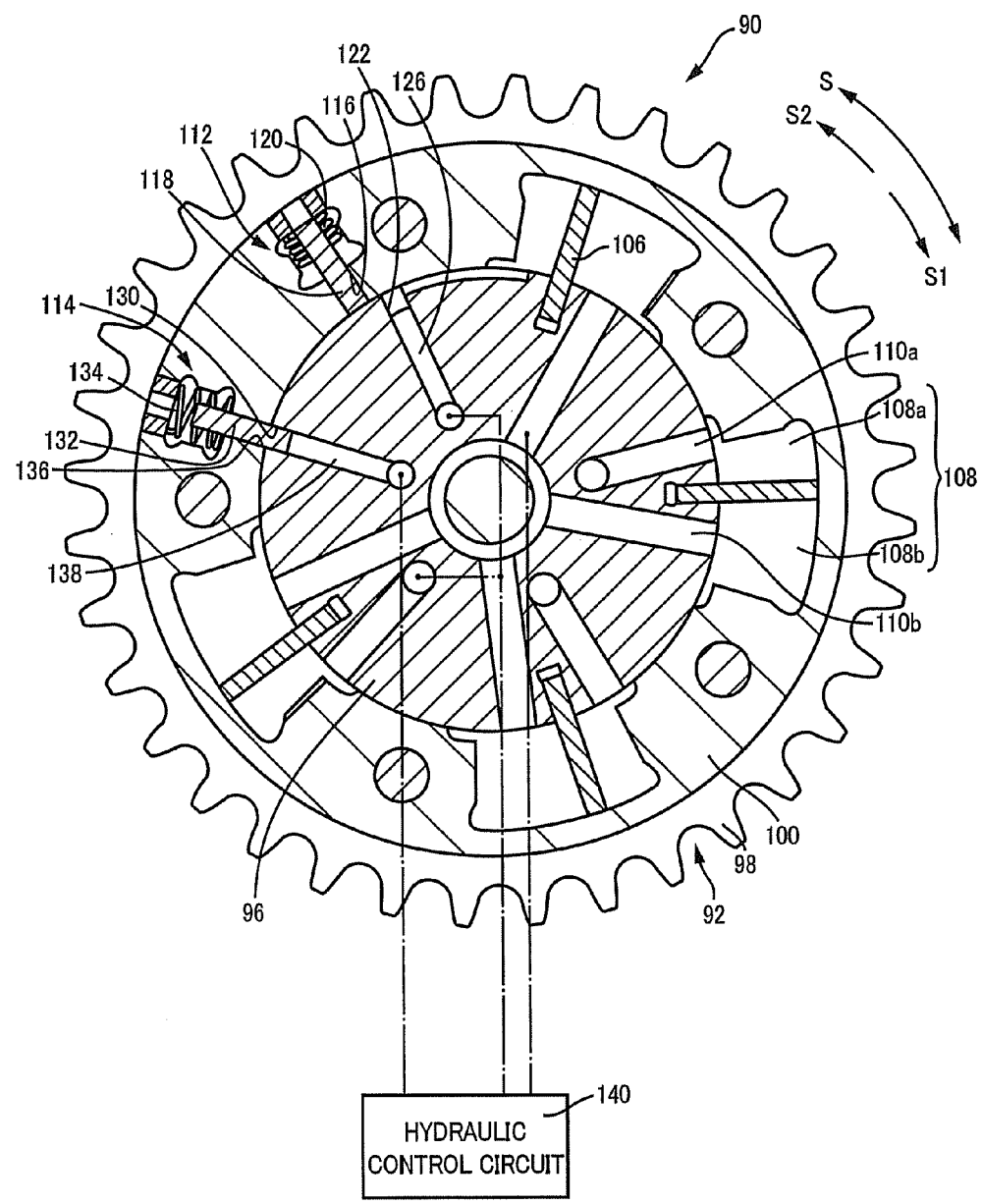
FIG. 5 is a cross sectional view for explaining operation of the variable valve timing mechanism of FIG. 4 and depicts a state fixing the opening/closing timing of the cam at the intermediately delayed position.

The engine 10 includes a variable valve timing mechanism 90 depicted in FIGS. 3, 4, and 5. In FIG. 3, the variable valve timing mechanism 90 includes an external rotor 92 operatively coupled via a timing chain to a crankshaft not depicted of the engine 10 and synchronously rotating with the crankshaft, and an internal rotor 96 disposed concentrically with and relatively rotatably to the external rotor 92 and fixed to and integrally rotating with a shaft end of a camshaft 94 making up a rotation shaft of a cam controlling opening/closing of an intake valve or an exhaust valve of the engine 10. The camshaft 94 is rotatably supported by a cylinder head of the engine 10. The external rotor 92 includes a cylindrical main body 100 having a timing sprocket 98 formed on an outer circumferential portion, a rear plate 102 fixed to the main body 100 on the camshaft 94 side, and a front plate 104 fixed to the main body 100 on the side opposite to the side on which the rear plate 102 is fixed. The internal rotor 96 is fitted into the external rotor 92 relatively rotatably within a predetermined relative rotation angle range corresponding to a valve opening/closing timing variable range to the external rotor 92 and is positioned between the rear plate 102 and the front plate 104. A torsion spring 105 interposed between the front plate 104 and the internal rotor 96 always relatively biases the internal rotor 96 and the external rotor 92 in an advance direction S1.

As the crankshaft of the engine 10 rotates, when the external rotor 92 and the internal rotor 96 fitted into the external rotor 92 is rotationally driven in a rotation direction S depicted in FIG. 4 and the camshaft 94 integrally fixed to the internal rotor 96 is also rotationally driven in the rotation direction S, a cam not depicted fixed to the camshaft 94 lifts and opens/closes an intake valve not depicted for opening/closing a cylinder of the engine 10, at predetermined timing. As depicted in FIG. 4, the internal rotor 96 has outwardly projecting rectangular plate-shaped vanes 106 disposed at a plurality of (in this embodiment, four) locations and an inner circumferential surface of the external rotor 92 has oil chambers 108 disposed at a plurality of locations and respectively housing the plurality of the vanes 106 in a circumferentially slidable manner. Each of the vanes 106 divides the oil chamber 108 housing the vane 106 to oil-tightly form an advance chamber 108a on the rotation direction S side relative to the vane 106 and a delay chamber 108b on the side opposite to the rotation direction S relative to the vane 106. As operating oil is supplied via an advance oil passage 110a into the advance chamber 108a and the vane 106 is moved toward the delay chamber 108b, the opening/closing timing of the exhaust valve or the intake valve is advanced. As the operating oil is supplied via a delay oil passage 110b into the delay chamber 108b and the vane 106 is moved toward the advance chamber 108a, the opening/closing timing of the exhaust valve or the intake valve is delayed.

When the operating oil is supplied via the advance oil passage 110a formed in the internal rotor 96 and a volume of the advance chamber 108a increases, a relative rotation phase of the internal rotor 96 to the external rotor 92 is changed in a delay direction S2. Conversely, when the operating oil is supplied via the delay oil passage 110b formed in the internal rotor 96 and a volume of the delay chamber 108b increases, a relative rotation phase of the internal rotor 96 to the external rotor 92 is changed in a delay direction S1. A variation range of the relative rotation phase of the internal rotor 96 to the external rotor 92, i.e., a variation range of delay or advance of the opening/closing timing of the cam opening/closing the intake valve or the exhaust valve corresponds to a movable range of the vane 160 in the oil chamber 108.

As depicted in FIG. 4, a most delayed lock mechanism 112 and an intermediate lock mechanism 114 are disposed on the external rotor 92 and the internal rotor 96 for constraining a displacement of the relative rotation phase of the internal rotor 96 to the external rotor 92 at a most delayed phase and a predetermined intermediately delayed phase, respectively. In this embodiment, the intermediately delayed phase is disposed at a predetermined phase between the most delayed phase and the most advanced phase corresponding to a side end portion of the advance chamber 108a and a side end portion of the delay chamber 108b in the movable range of the vane 106 in the oil chamber 108 such that the re-startability is acquired even under a limitation in output torque of the electric motor MG The most delayed lock mechanism 112 includes a guide groove 116 disposed to be opened on an inner circumferential side in the external rotor 92, a rectangular plate-shaped lock member 118 fitted into the guide groove 116 and guided in radial direction, a spring 120 biasing the lock member 118 toward the inner circumferential side, and a fitting hole 122 disposed in the internal rotor 96 for fitting an inner circumferential end of the lock member 118 therein at the most delayed position. The fitting hole 122 is in communication with a lock oil passage 126 communicating with the advance chamber 108a and the advance oil passage 110a. While an operating oil pressure is supplied to a regulating oil passage 138 and a lock at an intermediately delayed position by the intermediate lock mechanism 114 is released, when the operating oil is supplied through the delay oil passage 110b to the delay chamber 108b and the lock member 118 reaches the fitting hole 122, the lock member 118 is fitted into the fitting hole 122 by a biasing force of the spring 120 to establish a lock at the most delayed position as shown in FIG. 4. When an oil pressure is supplied to the lock oil passage 126, the lock member 118 is pushed out from the fitting hole 122 against the biasing force of the spring 120 and the lock at the most delayed position is released.

As is the case with the most delayed lock mechanism 112, the intermediate lock mechanism 114 includes a guide groove 130 disposed to be opened on the inner circumferential side in the external rotor 92, a rectangular plate-shaped lock member 132 fitted into the guide groove 130 and guided in radial direction, a spring 134 biasing the lock member 132 toward the inner circumferential side, and a fitting hole 136 disposed in the internal rotor 96 for fitting an inner circumferential end of the lock member 132 therein at the predetermined intermediately delayed position. The fitting hole 136 is in communication with the regulating oil passage 138. When the operating oil is supplied through the delay oil passage 110b to the delay chamber 108b and the lock member 132 reaches the fitting hole 136, the lock member 132 is fitted into the fitting hole 136 by a biasing force of the spring 134 to establish the lock at the intermediately delayed position as depicted in FIG. 5. When an operating oil pressure is supplied to the regulating oil passage 138, the lock member 132 is pushed out from the fitting hole 136 against the biasing force of the spring 134 and the lock at the intermediately delayed position is released.

Figure 6:
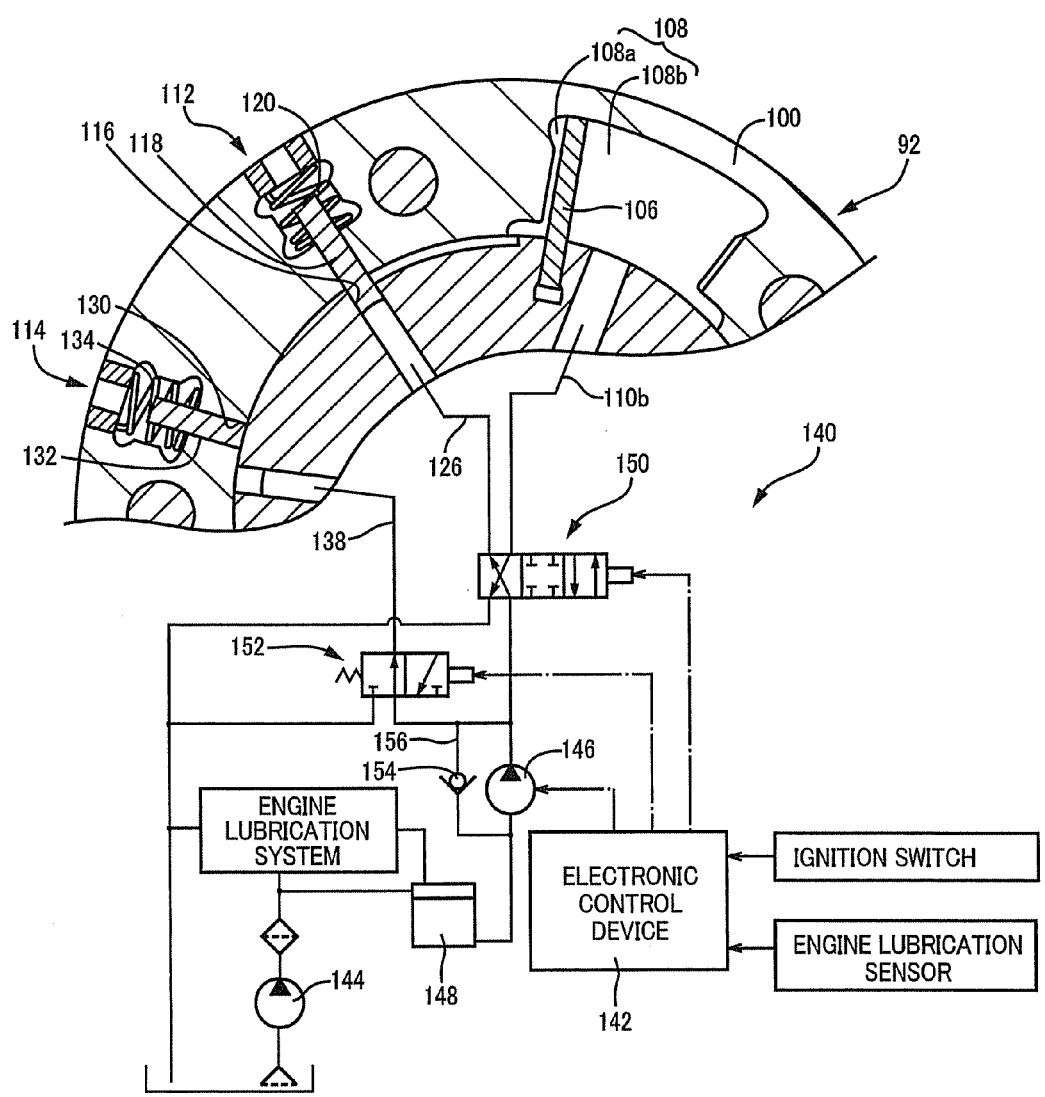
FIG. 6 is a diagram for explaining a control system of the variable valve timing mechanism of FIGS. 3 to 5.

FIG. 6 depicts a hydraulic control circuit 140 and an electronic control device 142 controlling the variable valve timing mechanism 90. The electronic control device 142 is a so-called computer including a CPU, a RAM, a ROM, and an interface and also acts as a control device of the engine 10. The hydraulic control circuit 140 includes a hydraulic pump 144 rotationally driven by the engine 10, an electric pump 146 rotationally driven by an electric motor that is disposed in a downstream side of the first hydraulic pump 144, and is a power source different from the engine 10, an accumulator 148 disposed between the hydraulic pump 144 and the electric pump 146 and capable of accumulating the operating oil, a first control valve 150 controlling a supply of the operating oil to the oil chamber 108 and the most delayed lock mechanism 112, a second control valve 152 controlling a supply of the operating oil to the intermediate lock mechanism 114, and a bypass oil passage 156 disposed in parallel with the electric pump 146 and having a check valve 154.

When receiving an operation permitting command from an ignition switch or a system ready switch etc., the electronic control device 142 puts the engine and the electric motor into an operable state and controls the engine or the electric motor such that a request output is acquired in response to acceleration operation at optimum fuel efficiency. When receiving an operation stopping command, the electronic control device 142 puts the engine or the electric motor into an inoperable state. The electronic control device 142 detects a state amount related to an operation state of the engine 10, for example, a temperature Toil of lubrication oil and a temperature of cooling water Tw, and controls the variable valve timing mechanism 90 for the next start to control at least the closing timing of the intake valve of the engine 10 to an intermediately delayed lock position or a most delayed lock position depending on whether it is estimated that the engine startability is ensured and on an output limitation state and a torque limitation state of the electric motor MG, in a stopping process after a stopping command is output for a rotation of the engine 10 until the rotation of the engine 10 stops under a stop request of the engine 10.

Figure 7:
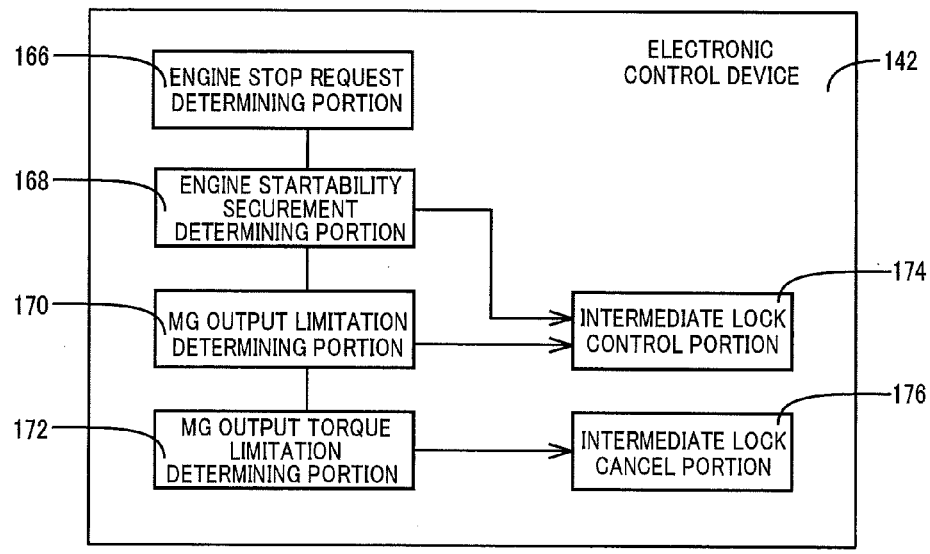
FIG. 7 is a functional block diagram for explaining a main portion of a control function of the electronic control device of FIG. 6.

FIG. 7 is a functional block diagram for explaining a main portion of a control function of the electronic control device 142. In FIG. 7, an engine stop request determining portion 166 determines whether another control portion, for example, a hybrid control portion or a drive control portion, makes an engine stop request for starting electric motor running or idling reduction. If it is determined that the engine stop request is made, an engine startability securement determining portion 168 determines whether it is estimated that re-startability for smoothly restarting the engine 10 is secured at the restart of the engine 10, based on the oil temperature Toil and/or the cooling water temperature Tw of the engine 10. For example, if the oil temperature Toil and/or the cooling water temperature Tw of the engine 10 exceeds an extreme low temperature determination value preset to, for example, −20 degrees C. or less, the engine startability securement determining portion 168 determines that the re-startability of the engine 10 is secured.

An MG output limitation determining portion 170 determines whether it is predicted at the restart of the engine 10 that an output (kw) of the electric motor MG is limited at the restart of the engine 10 as compared to a preset output necessary for the restart of the engine 10, based on at least one of a temperature Tm of the electric motor MG, a temperature of an inverter Ti controlling a drive current to the electric motor MG, rise or fall of a temperature Tb of a battery, and a charge remaining amount SOC of the battery. In other words, with regard to an output limitation value determined in at least one of the cases that the temperature Tm of the electric motor MG is higher than a temperature preset for protection from heating thereof, that the temperature Ti of the inverter is higher than a temperature preset for protection from heating thereof, that the temperature Tb of the battery is higher or lower than an operating temperature range set so as not to deteriorate the performance of the battery, and that the charge remaining amount SOC of the battery exceeds or falls below an SOC usage range preset so as not to deteriorate the durability performance of the battery, if the output limitation value is lower than a cranking output preset for acquiring a predefined cranking rotation number at the restart of the engine 10, the MG output limitation determining portion 170 determines that the output of the electric motor MG is predicted to be limited at the restart of the engine 10 as compared to the preset output necessary for the restart of the engine 10, i.e., that the output of the electric motor MG is predicted to be insufficient and unable to increase the cranking rotation number for the restart of the engine 10 higher than predefined rotation.

While the MG output limitation determining portion 170 determines that the output of the electric motor MG is predicted to be limited at the restart of the engine 10 as compared to the preset output necessary for the restart of the engine 10, an MG output torque limitation determining portion 172 determines whether the output torque of the electric motor MG is predicted to be limited at the restart of the engine 10 as compared to a preset cranking torque (m-kg) necessary for the restart of the engine 10, based on at least one of the temperature Tm of the electric motor MG, the temperature of the inverter Ti controlling the drive current to the electric motor MG, rise or fall of the temperature Tb of the battery, and the charge remaining amount SOC of the battery. In other words, with regard to a current limitation value determined in at least one of the cases that the temperature Tm of the electric motor MG is higher than a temperature preset for protection from heating thereof, that the temperature Ti of the inverter is higher than a temperature preset for protection from heating thereof, that the temperature Tb of the battery is higher or lower than an operating temperature range set so as not to deteriorate the performance of the battery, and that the charge remaining amount SOC of the battery exceeds or falls below an SOC usage range preset so as not to deteriorate the durability performance of the battery, if the current limitation value is lower than a cranking current preset for acquiring a predefined cranking rotation number at the restart of the engine 10, the MG output torque limitation determining portion 172 determines that the output torque of the electric motor MG is predicted to be limited at the restart of the engine 10 as compared to a preset cranking torque necessary for the restart of the engine 10.

If the MG output limitation determining portion 170 determines that the output of the electric motor MG is predicted to be limited at the restart of the engine 10 as compared to the preset output necessary for the restart of the engine 10, an intermediate lock control portion 174 locks the closing timing at the time of stop of the engine 10 to an intermediate lock position by the intermediate lock mechanism 114. In other words, the intermediate lock mechanism 114 is used for fixing the closing timing of the intake valve opened/closed by the cam in the stopping process of the engine 10 to the predetermined intermediately delayed position within the delay range. This is because under the situation where the output of the electric motor MG is limited, the compression ratio is increased to enhance an explosion power at the engine start as compared to the case of the closing timing of the intake valve set to the most delayed position, thereby securing a start performance of the engine 10.

Even when MG output limitation determining portion 170 determines that the output of the electric motor MG is predicted to be limited at the restart of the engine 10 as compared to the preset output necessary for the restart of the engine 10, if the MG output torque limitation determining portion 172 determines that the output torque of the electric motor MG is predicted to be limited at the restart of the engine 10 as compared to the preset cranking torque (m-kg) necessary for the restart of the engine 10, an intermediate lock cancel portion 176 does not allow the intermediate lock mechanism 114 to lock the closing timing at the time of stop of the engine 10 to the intermediate lock position. In other words, the intermediate lock cancel portion 176 inhibits the intermediate lock control portion 174 to fix the closing timing of the intake valve opened/closed by the cam in the stopping process of the engine 10 to the predetermined intermediately delayed position within the delay range so that the closing timing is fixed to the most delayed position. This is because under the situation where the output and torque of the electric motor MG are limited, the engine is driven at the most delayed position associated with a relatively lower rotation load of the engine 10 by utilizing the fact that an output torque value lower than the output torque value capable of securing the re-startability of the engine 10 can be output within a range of the limited output of the electric motor, thereby preferentially cranking the engine 10 to secure the re-startability thereof.

Figure 8:
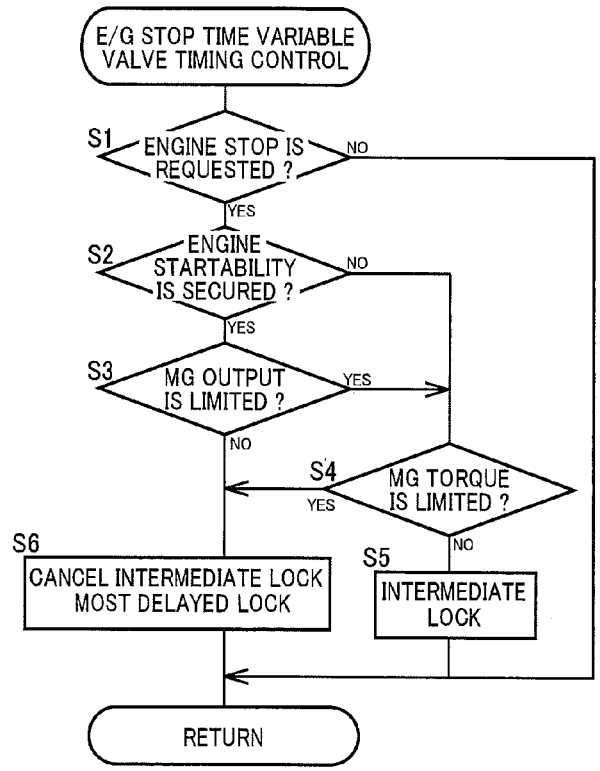
FIG. 8 is a flowchart for explaining a main portion of a control operation of the electronic control device of FIG. 6.

FIG. 8 is a flowchart for explaining a main portion of a control operation of the electronic control device 142 and depicts an engine stop time variable valve timing control routine. The control routine is repeatedly executed in a predetermined control period, for example, on the order of a few milliseconds to a few tens of milliseconds.

In FIG. 8, at step S1 (hereinafter, step will be omitted) corresponding to the engine stop request determining portion 166, it is determined whether another control portion, for example, a hybrid control portion or a drive control portion, makes an engine stop request for starting the electric motor running etc. If this determination is negative, this routine is terminated or, if affirmative, it is determined whether the engine 10 is restarted even when the cam position is the most delayed, based on whether the oil temperature Toil and/or the cooling water temperature Tw of the engine 10 indicates an extremely low temperature.

If the determination at S2 is affirmative, at S3 corresponding to the MG output limitation determining portion 170, it is determined whether the output (kw) of the electric motor MG is predicted to be limited at the restart of the engine 10 as compared to the preset output necessary for the restart of the engine 10, based on the output limitation value determined in at least one of the cases that the temperature Tm of the electric motor MG is higher than a temperature preset for protection from heating thereof, that the temperature Ti of the inverter is higher than a temperature preset for protection from heating thereof, that the temperature Tb of the battery is higher or lower than an operating temperature range set so as not to deteriorate the performance of the battery, and that the charge remaining amount SOC of the battery exceeds or falls below an SOC usage range preset so as not to deteriorate the durability performance of the battery, i.e., based on whether the output limitation value is lower than the preset cranking output.

If the determination at S3 is negative, i.e., if the output of the electric motor MG is not predicted to be limited at the restart of the engine 10 as compared to the preset output necessary for the restart of the engine 10, at S6 corresponding to the intermediate lock cancel portion 176, it is inhibited to fix the closing timing of the intake valve opened/closed by the cam in the stopping process of the engine 10 to the predetermined intermediately delayed position within the delay range, and the closing timing is fixed to the most delayed position so as to lower the explosive power and reduce vibrations at the restart of the engine 10.

If the determination at S2 is negative and it is not estimated that re-startability for smoothly restarting the engine 10 is secured at the restart of the engine 10, or if the determination at S3 is affirmative and the output of the electric motor MG is predicted to be limited at the restart of the engine 10 as compared to the preset output necessary for the restart of the engine 10, at S4 corresponding to the MG output torque limitation determining portion 172, it is determined whether the output torque of the electric motor MG is predicted to be limited at the restart of the engine 10 as compared to the preset cranking torque (m-kg) necessary for the restart of the engine 10, based on the current limitation value determined in at least one of the cases that the temperature Tm of the electric motor MG is higher than a temperature preset for protection from heating thereof, that the temperature Ti of the inverter is higher than a temperature preset for protection from heating thereof, that the temperature Tb of the battery is higher or lower than an operating temperature range set so as not to deteriorate the performance of the battery, and that the charge remaining amount SOC of the battery exceeds or falls below an SOC usage range preset so as not to deteriorate the durability performance of the battery, i.e., based on whether the current limitation value is lower than the preset cranking current.

If the determination at S4 is negative, at S5 corresponding to the intermediate lock control portion 174, the intermediate lock mechanism 114 is used for fixing the closing timing of the intake valve opened/closed by the cam in the stopping process of the engine 10 to the predetermined intermediately delayed position within the delay range, and the compression ratio is increased to enhance the explosion power at the engine start as compared to the case of the closing timing of the intake valve set to the most delayed position, thereby securing the start performance of the engine 10.

However, if the determination at S4 is affirmative, at S6 corresponding to the intermediate lock cancel portion 176, it is inhibited to fix the closing timing of the intake valve to the predetermined intermediately delayed position within the delay range in the stopping process of the engine 10 at S5 (by the intermediate lock control portion 174), and the closing timing of the intake valve is fixed at the most delayed position so that the engine is driven at the most delayed position associated with a relatively lower rotation load of the engine 10 by utilizing the fact that an output torque value lower than the output torque value capable of securing the re-startability of the engine 10 can be output within a range of the limited output of the electric motor, thereby preferentially cranking the engine 10 to secure the re-startability thereof.

As described above, according to the electronic control device 142 of this embodiment, for example, if an output limitation of the electric motor MG is predicted at the restart of the engine 10 during the electric motor running or the temporary stop of the vehicle, the closing timing of the intake valve is fixed to the intermediate position within the delay range in the process of locking the closing timing at the time of stop of the engine 10 to the intermediate lock position by the intermediate lock mechanism 114 and, therefore, the explosion power and the re-startability at the restart of the engine 10 is increased when the engine running is started or the vehicle starts again.

According to the electronic control device 142 of this embodiment, if the torque limitation of the electric motor MG is predicted in addition to the prediction of the output limitation of the electric motor MG at the restart of the engine 10, the engine 10 is stopped without actuating the intermediate lock mechanism 114 and the closing valve timing of the intake valve is set to the most delayed position. Therefore, if the torque limitation is predicted in addition to the output limitation of the electric motor MG at the restart of the engine 10, since the closing timing at the time of stop of the engine 10 is not locked at the intermediate lock position by the intermediate lock mechanism 114, the engine 10 can be driven at the most delayed position associated with a relatively lower rotation load of the engine 10 by utilizing the fact that an output torque lower than the output torque value capable of securing the re-startability of the engine 10 can be output within a range of the limited output of the electric motor MG thereby preferentially cranking the engine 10 to secure the re-startability thereof.

According to the electronic control device 142 of this embodiment, if the output limitation of the electric motor MG is predicted at the restart of the engine 10, the output limitation of the electric motor MG is predicted to be performed at the restart of the engine 10, resulting in an insufficient output for restart of the engine 10, based on at least one of the temperature Tm of the electric motor MG the temperature Ti of the inverter controlling the drive current to the electric motor MG; rise of the temperature Tb of the battery, reduction in temperature of the battery, and the charge remaining amount SOC of the battery. In other words, in at least one of the cases that the temperature Tm of the electric motor MG is higher than a temperature preset for protection from heating thereof, that the temperature Ti of the inverter is higher than a temperature preset for protection from heating thereof, that the temperature Tb of the battery is higher or lower than an operating temperature range set so as not to deteriorate the performance of the battery, and that the charge remaining amount SOC of the battery exceeds or falls below an SOC usage range preset so as not to deteriorate the durability performance of the battery, the output limitation of the electric motor MG is predicted to be performed at the restart of the engine 10, resulting in the insufficient output for restart of the engine 10. Therefore, the output limitation of the electric motor is certainly predicted at the restart of the engine depending on a vehicle state.

According to the electronic control device 142 of this embodiment, if the output limitation of the electric motor MG is not predicted at the restart of the engine 10, the closing timing at the time of stop of the engine 10 is not locked at the intermediate lock position by the intermediate lock mechanism 114. Since the output limitation of the electric motor MG is not performed at the restart of the engine 10, the engine 10 can be started from the most delayed state and the vibrations at the restart are reduced.

Although the embodiment of the present invention has been descried in detail with reference to the drawings, this is merely an embodiment and the present invention can be implemented in variously modified and improved forms based on the knowledge of those skilled in the art.

For example, in the embodiment, at the time of an engine stop request from the engine running to the motor running in a single-motor hybrid vehicle, if an output shortage of the electric motor MG at the restart is predicted, the intermediate lock mechanism 114 is used for fixing the closing timing of the intake valve opened/closed by the cam in the stopping process of the engine 10 to the predetermined intermediately delayed position within the delay range in preparation for the restart of the engine 10 in the example; however, in a vehicle having an idle reduction function of stopping an engine during stop, for example, when the engine is stopped in response to a D-range, a vehicle speed of zero, and a braking operation, if the output shortage of the electric motor MG at the restart is predicted, the intermediate lock mechanism may be used for fixing the closing timing of the intake valve opened/closed by the cam in the stopping process of the engine 10 to the predetermined intermediately delayed position within the delay range in preparation for the restart of the engine.

In the embodiment, the intermediate lock cancel portion 176 is provided that inhibits the closing timing of the intake valve opened/closed by the cam from being fixed to the predetermined intermediately delayed position within the delay range by using the intermediate lock mechanism 114 so that the closing timing is set to the most delayed position if the output shortage and the torque shortage of the electric motor MG at the restart of the engine 10 are predicted when the engine 10 is stopped; however, this is not necessarily essential.

The above description is merely an embodiment of the present invention and the present invention may be implemented in other forms.

Nomenclature of Elements

10: engine 90: variable valve timing mechanism 114: intermediate lock mechanism 142: electronic control device (a control device of a vehicle engine) 168: engine startability securement determining portion 170: MG output limitation determining portion 172: MG output torque limitation determining portion 174: intermediate lock control portion 176: intermediate lock cancel portion MG: electric motor

The invention claimed is:

1. A control device of a vehicle engine comprising:
an electric motor rotationally driving an engine to start the engine; a variable valve timing mechanism varying a valve timing of an intake valve of the engine; and an intermediate lock mechanism mechanically locking the valve timing at an intermediate position between a most delayed position and a most advanced position of the valve timing,
if an output limitation of the electric motor is predicted at restart of the engine, the valve timing at the time of stop of the engine being locked at the intermediate lock position by the intermediate lock mechanism.

2. The control device of a vehicle engine of claim 1, wherein if the output limitation of the electric motor is not predicted at the restart of the engine, the valve timing at the time of stop of the engine is not locked at the intermediate lock position by the intermediate lock mechanism.

3. The control device of a vehicle engine of claim 1, wherein if a torque limitation of the electric motor is predicted in addition to prediction of the output limitation of the electric motor at the restart of the engine, the valve timing at the time of stop of the engine is not locked at the intermediate lock position by the intermediate lock mechanism.

4. The control device of a vehicle engine of claim 1, wherein the output limitation of the electric motor at the restart of the engine is predicted based on at least one of a temperature of the electric motor, a temperature of an inverter controlling a drive current of the electric motor, rise or fall of a temperature of a battery supplying a drive current to the electric motor, and a charge remaining amount of the battery.

* * * * *